United States Patent [19]

Paterson et al.

[11] Patent Number: 5,082,995
[45] Date of Patent: Jan. 21, 1992

[54] ELECTRICAL CABLES

[75] Inventors: John R. Paterson, Cumbria; Leonard Warren, Manchester, both of Great Britain

[73] Assignee: Vickers Shipbuilding & Engineering Limited, Cumbria, United Kingdom

[21] Appl. No.: 456,819

[22] Filed: Dec. 13, 1989

[51] Int. Cl.$^5$ .................................................. H01B 7/34
[52] U.S. Cl. .................. 174/113 R; 174/110 R; 174/110 S; 250/515.1; 252/478
[58] Field of Search ............ 174/113 R, 110 R, 110 S; 250/515.1; 252/478

[56] References Cited

U.S. PATENT DOCUMENTS

| | | | |
|---|---|---|---|
| 2,718,544 | 9/1955 | Shepp | 174/113 R |
| 3,576,388 | 4/1971 | Bruns | 174/113 R X |
| 3,576,940 | 5/1971 | Stone | 174/113 R |
| 3,710,007 | 1/1973 | Hoeg et al. | 174/113 R X |
| 4,176,093 | 11/1979 | Zoch | 252/478 |
| 4,470,898 | 9/1984 | Penneck et al. | 252/512 X |
| 4,600,806 | 7/1986 | Beretta | 174/113 R |
| 4,634,615 | 1/1987 | Versteegh et al. | 428/913 X |
| 4,726,993 | 2/1988 | Zaopo | 174/110 R X |

Primary Examiner—Morris H. Nimmo
Attorney, Agent, or Firm—Pollock, VandeSande & Priddy

[57] ABSTRACT

An electrical cable has one or more electrical conductors (1A, 1B, 1C) enveloped in electrically insulating material (2A, 2B, 2C, 3, 5, 13). At least some of the electrically insulating material is formed of a composition having an elastomer, an oxide of iron and silicon carbide.

9 Claims, 2 Drawing Sheets

ELECTRICAL CABLES

FIELD OF THE INVENTION

This invention relates to electrical cables and is concerned with cables designed especially to withstand nuclear irradiation, to operate successfully under fire conditions and to withstand cycles of high temperature and steam pressure.

BACKGROUND OF THE INVENTION

As the trend towards greater reliability of components increases, especially those which may be subject to extremes of either normal operating conditions or accident conditions, so an equivalently greater reliability must be placed on the essential services supplied to these components. Cables supplying electrical power to such components can prove to be unreliable in certain circumstances.

For example when a fire occurs, the cable insulation is frequently burnt or melted allowing the conductors to short-circuit. This short-circuiting could have two adverse effects. Firstly, it could start additional fires. Secondly, it could immobilize essential electrical equipment, e.g. lighting, fire fighting pumps, electrically operated fire or escape doors, and the like.

Another example involves the use of electrical cables inside a nuclear reactor to operate coolant pumps, mensuration equipment, safety devices and the like. Combined gamma and neutron bombardment can cause the occurrence of either cross-linking or scission of the insulating material of the cables, thus changing the properties of the insulating material. Both these factors can lead to embrittlement of the insulating material causing it to crack and hence possibly cause a short circuit when movement occurs due to thermal cycling.

Further, in a water-moderated reactor, the complete loss of coolant could lead to a meltdown, a temperature of 1,000° C. and hydrogen (and other) fires. The electrical cables needed to supply power to mechanisms for the operation of control rods to shut down the reactor and the electrical cables needed to monitor the movement of the control rods would be subjected to such an environment. Also, it is possible that a fault in one of the control motors or mechanisms could lead to a short circuit in a cable which might cause high currents to flow in the cable and the resultant electromagnetic force developed may cause damage to the cable.

There is thus a need for an electrical cable capable of operating in extremely hostile environments on both a permanent and occasional basis.

SUMMARY OF THE INVENTION

According to the present invention, there is provided an electrical cable comprising an electrical conductor enveloped in electrically insulating material formed from a composition comprising an elastomer, silicon carbide, and an oxide of iron.

The composition used is an ablative rubber and, in an embodiment of the invention, the iron oxide is ferric oxide, preferably red iron oxide. Preferably the elastomer is one of the silicone rubbers, and particularly an addition curing polydimethyl siloxane with a platinum complex as curing catalyst, and the additives (iron oxide, and silicon carbide) are incorporated in a fine particulate form prior to the actual vulcanization process.

It has been found that electrical cables constructed in accordance with the present invention are capable of resisting the effects of extreme environmental conditions.

During the application of intense heat, the insulating material forms a mechanically strong ash or "char" which re-emits radiant energy almost as soon as it absorbs it.

Elastomers or additives containing halogen, sulphurous and cyanogen radicals are not preferred as they can oxidise to give acidic and/or poisonous gases which are both corrosive to materials and harmful if ingested. Halogen radicals are not desirable if nuclear radiation or neutron bombardment is involved as radio-nuclides can be formed.

In a particularly preferred embodiment of the invention, the lay up of the strands within a particular conductor and/or the lay up of a plurality of conductors within a particular cable is/are carefully controlled so that all said strands and/or all said conductors are essentially of equal length. The conductors are interposed to reduce inter-core capacitance and the lay length of the conductors and their angle of approach to each other are controlled to reduce electromagnetic forces.

Preferably, the lay lengths of each strand and/or conductor are closely monitored at regular intervals as the conductor/cable is laid up, e.g. every 10 cm.

It is preferred for the conductors and/or cable to be laid up in a manner such that the lay-length is as short as practical. The purpose of this is to provide reinforcement to prevent the envelope of insulating material from bursting under the action of electromagnetic and other forces. In an example, the lay-length was reduced to 44 mm, to give ten lay-lengths between supports and thus maximize the stiffness of the cable between supports.

In an embodiment, a reinforcing material is incorporated in the cable. Where high levels of radioactivity are present, the reinforcing material is preferably formed of woven glass filaments in the form of, for example, a spirally wound tape with the glass having a very low boron content. Where radioactivity will not be a problem, other materials, e.g. normal glass fibre etc, having appropriate thermal properties may be applicable. The purpose of the reinforcement is two fold. Firstly it contains the radial stresses when the cable is subjected to external high temperatures and pressure. Secondly it provides added resistance to combat the net repulsive effects which can occur between interacting magnetic fields due to the current flow in adjacent conductors.

The preferred way to incorporate such a reinforcing material is to place it in the form of a glass weave over the insulating material. If desired, it can be laid or wound over the insulating material and then be covered with a further thin layer of insulation, preferably an ablative rubber of the type described above, to give the glass weave reinforcing material protection against mechanical damage and/or exposure to heat or radiation. This further covering of insulation should be integral with the main body of the elastomer. Preferably the glass of the filaments is of the very low boron type for applications where neutron bombardment could be involved, as boron is a high absorber of neutrons.

In an embodiment, the cable comprises a plurality of conductors each enveloped in said electrically insulating material and laid up as disclosed herein. Such plurality of insulated conductors is then surrounded by a body of similar insulating material which also extends into any gaps between the plurality of conductors such as to give an essentially cylindrical envelope. In this way, the whole of the outer circumference of each insulated conductor is firmly embedded in insulating material thus greatly reducing the scope for the conductors to move or vibrate.

Suitably constructed, cables in accordance with the present invention are capable of accommodating 11 kv or more.

BRIEF DESCRIPTION OF THE DRAWINGS

For a better understanding of the invention and to show how the same may be carried into effect, reference will now be made, by way of example only, to the accompanying drawings, in which.

DETAILED DESCRIPTION OF THE INVENTION

Figure 1:
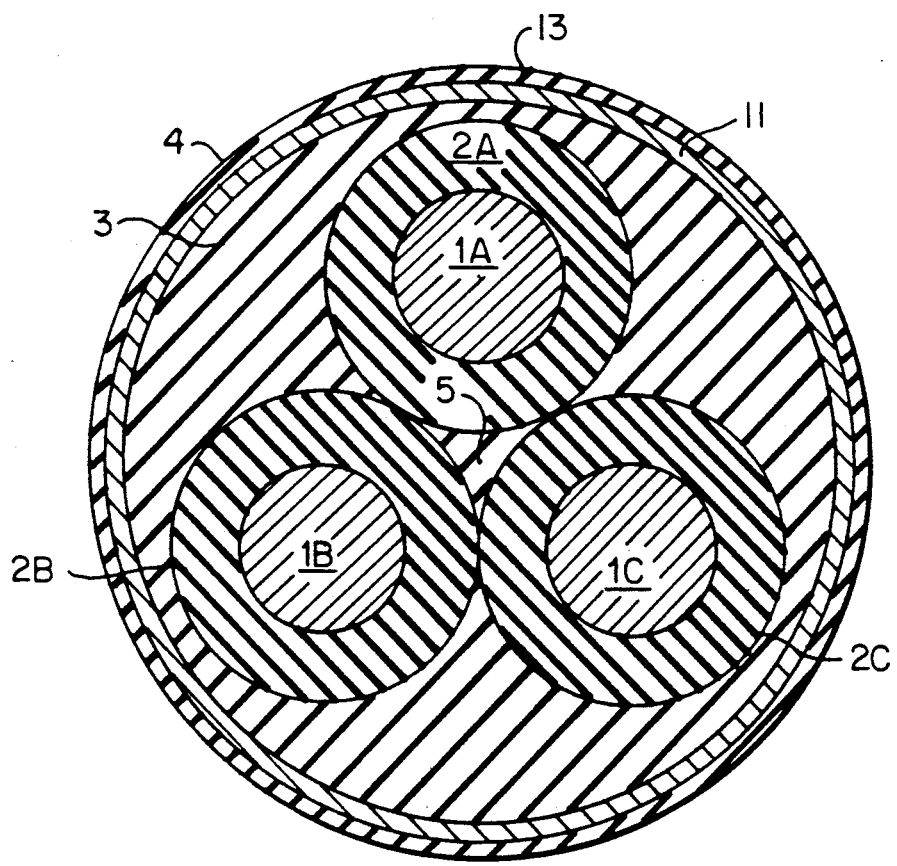
FIG. 1 shows a section through an electrical cable in accordance with the invention.

In the Figures, the same parts are denoted by the same reference numerals through-out. The letters A, B and C refer to the same position for the respective conductors, as shown in FIG. 1.

Referring to FIG. 1, the cable comprises three electrical conductors 1A, 1B and 1C each of which is provided with a sheath 2A, 2B and 2C of an electrically insulating material formed of ablative rubber. The sheathed conductors are also surrounded by said electrically insulating material which fills the circumferential zones 3 (i.e., insulating material 3) between the sheathed conductors and said electrically insulating material is also provided in the axial zone 5 (i.e., insulating material 5) between the sheathed conductors. A tape 11 of woven glass filaments or a winding of a cord of glass filaments is spirally wound around the insulating material 3 and covered with an outer sheath 13 also formed of said electrically insulating material to define the outer surface of the cable.

In order for an electrical cable to be able to withstand high temperatures and/or radiation/neutron bombardment, three properties are desirable, i.e.

a) Incident energy should be re-radiated at a rate which is as near as possible to the rate at which it is absorbed.

b) Thermal conductivity (or diffusivity) into the cable matrix should be a minimum.

c) Any material used should not form a radio-nuclide under neutron bombardment.

In accordance with the present invention the electrically insulating material is formulated so as to achieve these properties.

It has been found that these properties are best achieved by the use of the compounds disclosed herein added to the elastomer. Under the action of applied heat, the elastomer then undergoes physical and chemical changes to produce a low density, refractory ash which, though it absorbs radiation readily, re-radiates it equally well. Such an ash once formed must still possess the requisite mechanical properties to protect the unaffected cable underneath, i.e. it must provide an adherent, stable casing, resistant to vibration and minor impacts etc.

In accordance with the present invention, the electrically insulating material is formed from a composition comprising an elastomer, an oxide of iron, and silicon carbide. Extensive tests have shown that addition reaction silicone elastomers, such as polydimethyl siloxanes with a platinum complex as curing catalyst, are the best base material, but conventional heat cured silicone rubbers and elastomers with vinyl groups cross-linked with peroxide can also be used with the addition of the special fillers herein disclosed. Development tests have shown that the following formulation for the electrically insulating material for sheaths 2A, 2B and 2C and for zones 3 and 5 provides the best result:

| Iron Oxide | ($Fe_2O_3$) | 3.0–35% by weight |
|---|---|---|
| Silicon Carbide | (SiC) | 40–55% by weight |
| Elastomer | (C, H, O, Si) | Balance. |

Experiments have indicated that a content of about 7½% by weight of iron oxide is optimum but the actual formulation used can be varied depending upon the particular circumstances. It will be noted that the above formulation contains no halides or cyanogen radicals which could lead to the formation of acidic or noxious gases, i.e. so that the products of combustion would not be harmful to personnel or equipment in the immediate environment.

The exact formulation used can be varied to produce cables to suit conditions which are always becoming increasingly more onerous, i.e. higher temperatures, higher levels of bombardment and radiation.

When the silicone elastomer is subjected to thermal degradation, some bond scission will occur between 300° to 450° C. with the production of volatiles and low molecular weight siloxanes which are driven off as stable vapours. Some hydrocarbons will also be formed. Formaldehyde may occur with carbon monoxide but these are transitory and are due to incomplete combustion. In the presence of oxygen, at high or low temperatures, combustion reactions will occur. Above 500° C. complete degradation of the molecule occurs. Water, carbon dioxide and silicon dioxide are produced. Some silicon dioxide escapes as particulates but most remains behind as an ash. The role of red iron oxide as an additional filler is complex. It is added as ferric oxide. The ferric oxide is reduced to the ferrous state by possible reaction with hydrocarbons and the heat of reaction will modify the ablative mechanism. The formation of ferrous oxide is believed to be of considerable help in the development of the ash by adding to its mechanical integrity. It will react with silica to form ferrous silicate which mechanically strengthens the ash. The surface of the elastomer is formed into a refractory surface. Such a surface will absorb incident radiant energy and almost immediately re-radiate it. This helps to protect the underlying elastomer from further damage. The additional filler (silicon carbide) has a low thermal conductivity and hence the rate of heat transfer by conduction into the elastomer substrate is very much reduced. This provides a second protective mechanism.

Silicon carbide has an extremely low neutron capture cross-sectional area. Because only iron, silicon, carbon, hydrogen and oxygen are present in the insulation, no harmful radio-nuclides are formed under neutron bombardment or in the presence of other types of radiation. The only radio-nuclides formed are due to the iron and though this is undesirable, the thermal benefits conferred by using iron far outweigh this minor drawback.

Health and safety is a factor to be borne in mind in all modern designs. It is a feature of the insulating material of the above formulation that only a little light grey/whitish smoke is produced when it is subjected to the effects of heat. The smoke is nontoxic and allows 75% transmission of light. The refractory ash produced on the outside of the cable is mechanically strong, resists vibration and does not produce dust.

Figure 2:
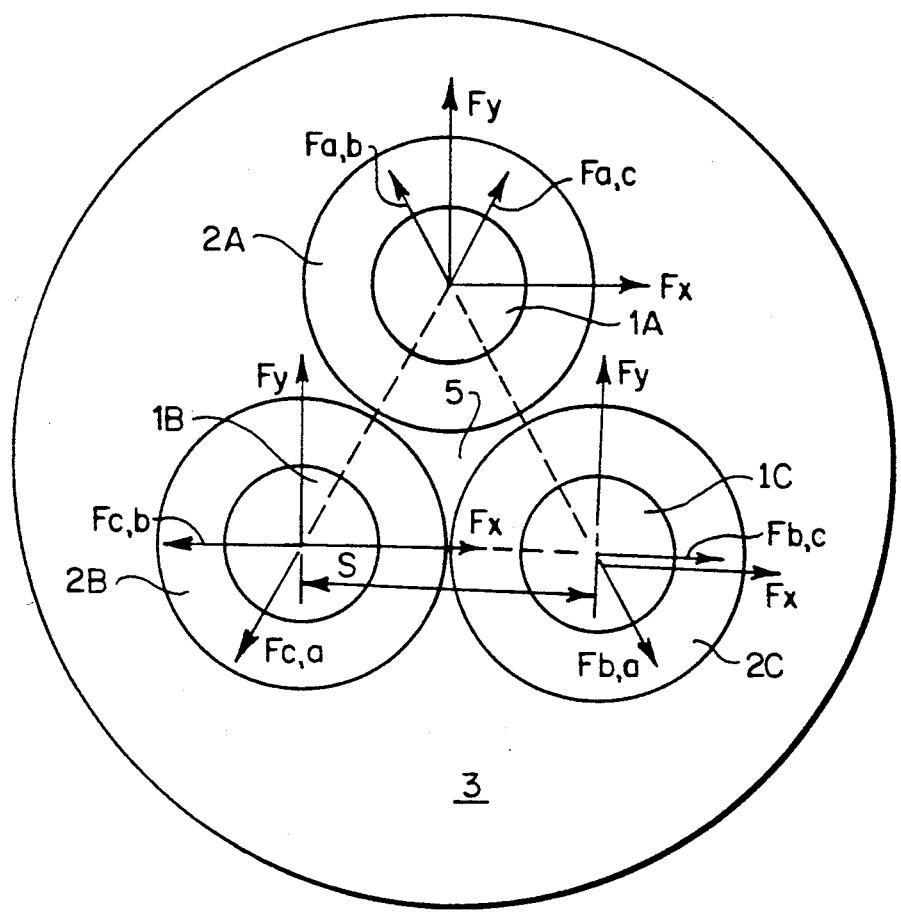
FIG. 2 shows a section through the cable of FIG. 1 on a larger scale.

FIG. 2 corresponds to FIG. 1 and represents a cable carrying three phase current. (Here conductors 1A-C are not hatched to avoid confusion). The passage of current in the conductors induces a magnetic field. As shown in FIG. 2, the electromagnetic forces generated by any pair of conductors produces a reaction on each other, e.g. for conductors 1A and 1B, there is a reaction Fac on 1A and Fca on 1B. Thus for conductor 1A, there are two reactions Fab and Fac which may be resolved horizontally and vertically into forces Fx and Fy respectively giving a resultant vector Va. Similar vectors Vb and Vc exist for the other two conductors 1B and 1C respectively. The magnitude and direction of each vector Va, Vb and Vc will change as the currents in each conductor vary, particularly if alternating currents are flowing. Consequently these vectors are not shown on FIG. 2 as they will rotate through the full 360° in phase with the frequency of current being carried.

The force between two long parallel current-carrying conductors is given by:

$$F \propto \frac{2I_1 I_2 \cdot L}{S}$$

Where
F = the resultant electromagnetic force, in Newtons,
$I_1$ and $I_2$ = the current flowing in the conductors, in Amperes
L = the length of each conductor in meters and
S = the spacing between the conductors in meters.

Clearly, to minimize resultant force F, the length L should be minimized and the conductor spacing S should be maximized.

In the design of the cable of the invention, electromagnetic forces are controlled by ensuring that the conductors do not lie parallel to each other for long lengths and the angle at which they approach each other is carefully chosen. This affects the "lay lengths" (denoted by reference numeral 10 in FIG. 3) of the conductors. Also the lay length is shortened to balance the electromagnetic affects in each conductor and to help the cable to withstand external mechanical forces.

In the above relationship, the constant of proportionality is small. However, for even moderate currents, $I_1.I_2$ will be large and as space requirements frequently demand cables of the minimum diameter possible, the conductor spacing S is not always as large as preferred. Vectors Va, Vb and Vc will rotate as stated previously. There will also be a tendency for each conductor to rotate. Thus, the insulating material separating conductors 1A, 1B and 1C will be subjected to complex stresses. There will also be a tendency for the conductors to move radially outwards so that the outer sheath 13 is also under stress. If the insulation has been weakened due to serious environmental conditions, this will enhance the tendency of the insulation to burst under short circuit and the cable of the invention is designed to withstand this.

Figure 3:
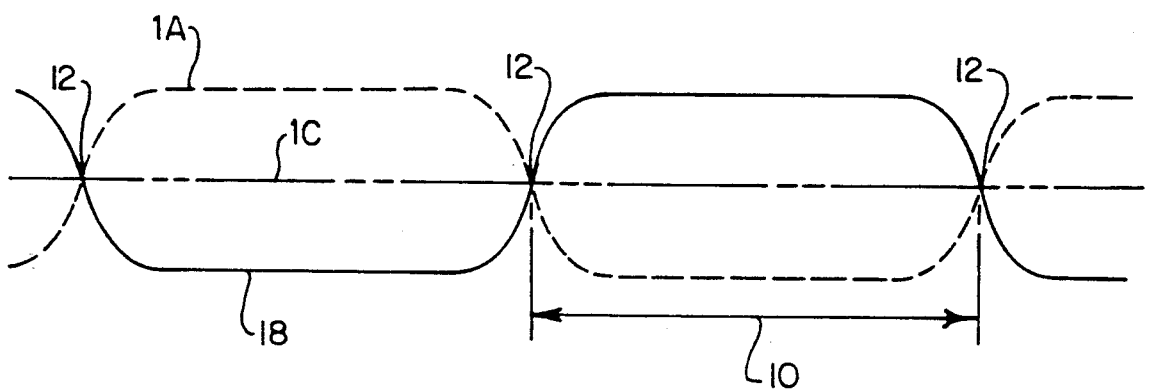
FIG. 3 shows a diagrammatic side elevation of the cable of FIGS. 1 and 2.

To the untrained eye, the three insulated conductors 1A, 2A; 1B, 2B and 1C, 2C appear to be merely spiralled around each other under insulating material 3. To the trained eye, they are laid down to a predetermined 'lay-length' 10. FIG. 3 shows diagrammatically how the three conductors 1A, 1B, and 1C are laid relative to each other. For simplicity conductor 1C is shown as an apparently-straight chain-dotted line while conductors 1A (dashed) and 1B (solid line) change places at crossover points 12. The distance between two adjacent crossover points 12, designated 10, is known as the "lay length". As explained previously, the current flowing in a conductor generates a magnetic field which will react with the adjacent field generated by other conductors. As this effect is more pronounced when conductors run parallel to each other, it is desirable to have as short a lay-length as practicable. Furthermore, a short lay length makes a 'stronger' cable, i.e. it has greater mechanical strength to resist the bursting effect of repulsive electromagnetic fields. The most extreme case of this occurs when there is a short circuit where, because of the larger currents flowing, the electromagnetic forces are correspondingly greater. Though fuses or circuit breakers are used to protect the wiring, a high current has to flow to blow or trip these devices and consequently high electromagnetic forces are developed which can 'burst' the cable in the milliseconds before the current is cut off.

These problems can largely be overcome by attention to detail when laying up the conductors. The procedure is firstly to coat the conductors 1A, 1B and 1C with an even thickness of insulating material 2A, 2B and 2C as shown in FIG. 1. This requires careful attention to the setting of the coating machine and continuous monitoring during its operation. To make the actual cable, the three insulated conductors are prepared and fed into a laying up machine which is carefully adjusted and monitored closely while operating.

The problem of electromagnetic forces has been explained. With a properly laid up cable and short lay-lengths, this problem is reduced since the geometry of the construction acts to minimize the net repulsive forces. However, the integrity of the insulating material 3 can be increased if it is spirally bound with the glass filament tape or glass cord 11 (FIG. 1). The tape or cord 11 may be protected with a further layer of the same insulating material 13 to form an outer sheath. To minimize neutron absorption, a glass having very low boron content should be used for the tape or cord 11. Preferably the tape or cord 11 is wound on in tension to compress insulating material 3 and so pre-load it to resist the effect of bursting forces. The degree of tension in tape or cord 11 may be preselected at the manufacturing stage to suit the particular application for which the cable is being made.

When conventional cables are laid up, it is usual to have an artificial bolster running axially in the central zone between the three conductors. Such bolsters are usually non-conducting filaments. In the construction of cable shown in the Figures, no bolster is used. Instead, this zone 5 is filled with electrically insulating material and preferably with the same material as the material used for sheaths 2A, 2B, 2C and circumferential zone 3. However, for the most severe applications and the greatest margins of safety, all the insulating components (i.e. 13,3,5,2A, 2B and 2C), must be formed of the material herein described. Thus each insulated conductor is firmly held by insulation material (3,5) around the whole of its circumference. This is important in that it stops movement of the conductors which might otherwise occur due to electromagnetic interactions and thermal expansion. Even though this movement may be only small and little more than a vibration, it can have a serious effect on reducing working life on a long-term basis and reducing the cable's ability to accommodate accident/failure conditions on a short-term basis.

Examples of cables which have to withstand extremely harsh environments besides power cables are signal and control cables. Some will have multiple cores and some pairs of cores which will be surrounded by metal screens to prevent electromagnetic interference. These cables will have the conductors and the outer sheath insulated with the ablative elastomer as laid out in this specification. The thickness of the ablative elastomer will vary both for the conductor insulation and for their sheaths. The method of lay ups, though somewhat similar, will vary depending upon the size and number of cores and the use of the cable.

We claim:

1. An electrical cable comprising an electrical conductor enveloped in electrically insulating material formed from a composition comprising an elastomer, from 40 to 45% by weight of silicon carbide, and from 3 to 35% by weight of an oxide of iron (as $Fe_2O_3$).

2. A cable as claimed in claim 1 wherein the elastomer is a silicone rubber.

3. A cable as claimed in claim 1 wherein the oxide of iron is ferric oxide.

4. A cable as claimed in claim 1 which includes a plurality of said electrical conductors wherein each conductor is sheathed in a first layer of electrically insulating material and the sheathed conductors are enveloped in a second layer of electrically insulating material, the material of said second layer being formed from said composition.

5. A cable as claimed in claim 4 wherein the electrically insulating material of said first layer is formed from said composition.

6. A cable as claimed in claim 1 which includes a plurality of said electrical conductors wherein each conductor is sheathed in a first layer of electrically insulating material, circumferential and axial zones being provided between the sheathed conductors and these circumferential and axial zones are filled with electrically insulating material, wherein at least one of the electrically insulating material of said first layer and the electrically insulating material in said circumferential and axial zones is formed from said composition.

7. A cable as claimed in claim 6 wherein the electrically insulating material in said circumferential and axial zones is formed of said composition.

8. A cable as claimed in claim 6 wherein the electrically insulating material of said first layer is formed from said composition.

9. A cable as claimed in claim 1 which additionally includes a reinforcing material and a layer of electrically insulating material being provided around the reinforcing material, said layer of electrically insulating material being formed from said composition.

* * * * *